United States Patent
Yada et al.

(10) Patent No.: US 7,433,145 B2
(45) Date of Patent: Oct. 7, 2008

(54) MAGNETIC DISK APPARATUS

(75) Inventors: Hiroaki Yada, Kanagawa (JP); Keitaro Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 993 days.

(21) Appl. No.: 10/732,522

(22) Filed: Dec. 11, 2003

(65) Prior Publication Data

US 2005/0008341 A1    Jan. 13, 2005

Related U.S. Application Data

(63) Continuation of application No. 09/392,193, filed on Sep. 9, 1999, now abandoned.

(51) Int. Cl.
*G11B 19/02* (2006.01)

(52) U.S. Cl. ........................................ 360/69

(58) Field of Classification Search ............... 360/69, 360/75, 73.03, 77.04, 17, 97.01
See application file for complete search history.

(56) References Cited

U.S. PATENT DOCUMENTS

| | | | |
|---|---|---|---|
| 5,377,178 A | 12/1994 | Saito et al. | |
| 5,642,342 A | 6/1997 | Murata | |
| 6,240,238 B1 | 5/2001 | Yada | |

FOREIGN PATENT DOCUMENTS

| | | |
|---|---|---|
| JP | 8-096518 | 4/1996 |
| JP | 8-185677 | 7/1996 |
| JP | 8-306178 | 11/1996 |
| JP | 10-075424 | 3/1998 |
| JP | 10-106192 | 4/1998 |
| JP | 10-162483 | 6/1998 |

*Primary Examiner*—Fred Tzeng
(74) *Attorney, Agent, or Firm*—Oblon, Spivak, McClelland, Maier & Neustadt, P.C.

(57) ABSTRACT

Disclosed herein is a magnetic disk apparatus such as a hard disk apparatus or a removable hard disk apparatus which allows switching of the speed of rotation of a magnetic disk while assuring a sufficient tracking control characteristic and a sufficient capacity. More concretely, a magnetic disk apparatus of the present invention, in which tracking of a magnetic head is controlled with reference to a plurality of servo areas formed at predetermined angular distances on a magnetic disk to access the magnetic disk, includes; the servo areas being formed in synchronism with a fixed clock signal such that reference patterns for tracking control are formed therein, a clock generation means for generating a clock signal common to the plurality of servo areas with reference to reproduction signals obtained from the servo areas, a tracking control signal generation means for generating a control signal for tracking control from the reference patterns with reference to the clock signal, a tracking control means for controlling tracking of said magnetic head with reference to the control signal, and a speed switching means for switching the speed of rotation of the magnetic disk.

16 Claims, 5 Drawing Sheets

MAGNETIC DISK APPARATUS

BACKGROUND OF THE INVENTION

This invention relates to a magnetic disk apparatus, and more particularly to a magnetic disk apparatus such as, for example, a hard disk apparatus or a removable hard disk apparatus.

In a magnetic disk apparatus of a related art represented by a hard disk apparatus or a removable hard disk apparatus, efforts are directed to reduction of the access time and increase of the recording density.

The access time is a time required for a magnetic head to seek an aimed track to start recording or reproduction of a desired data area. In a magnetic disk apparatus of the type described above, the access time is represented by a sum of the seek time of the magnetic head and a latency time or rotational delay (typically, equal to one half of the time required for one rotation of the magnetic disk).

In particular, in a hard disk apparatus, a magnetic disk is driven to rotate in the condition of a constant angular velocity (CAV), so that, even if a seeking operation of the magnetic head is performed, the speed of rotation of the magnetic disk can be kept at a fixed rotational speed, thereby preventing an increase of the access time effectively. In the rotational driving in the condition of a constant angular velocity., the hard disk apparatus drives the magnetic disk to rotate at a high speed to assure a further reduction in access time.

Meanwhile, in order to increase the recording density, the linear recording density in a longitudinal direction of a track is increased and the track density is increased to increase the planar recording density. Incidentally, in recent years, products which have a recording density higher than 3 Gbit/inch$^2$ have been placed on the market.

Where the magnetic disk is rotated in such a high speed of rotation and has such a high recording density as described above, the hard disk apparatus has a high data transfer rate. In particular., in a 3.5-inch-hard disk apparatus whose linear recording density is higher than 200 kbit/inch, the speed of rotation of the disk is approximately 5,400 rpm, and the maximum data transfer rate is higher than 170 Mbit/sec.

In a magnetic disk apparatus of the type described above, in order to allow recording and reproduction of moving pictures on the real-time basis, it is required to lower the speed of rotation of the magnetic disk to reduce the data transfer rate and reduce the power consumption as much. On the other hand, in order to allow downloading of moving pictures to a personal computer, it is required to raise the speed of rotation of the magnetic disk to raise the data transfer rate.

In this instance, it can be estimated that the requirements given above can be satisfied by switching the speed of rotation of the magnetic disk when necessary.

However, the magnetic disk apparatus in the related art described above is disadvantageous in that, if the speed of rotation of the magnetic disk is switched in this manner, then a sufficient tracking control characteristic and a sufficient capacity cannot be assured.

In particular, in recent years, data of moving pictures are compressed in accordance with the MPEG (Moving Picture Experts Group) 2 standards. According to the MPEG2 standards, moving pictures of a sufficiently high picture quality can be displayed at an average data transfer rate of 4 to 8 Mbit/sec.

To the previous hard disk apparatus of the related art, the data transfer rate is unnecessarily high for real-time recording and reproduction of video data of the type described above.

The data transfer rate depends upon the speed of rotation of the magnetic disk as described above. Thus, if the unnecessarily high data transfer rate can be reduced accompanied with the speed of rotation of the spindle motor lowered as much, then the power consumption and noise can be reduced accordingly.

However, if the speed of rotation of the magnetic disk is reduced in this manner, then the positioning accuracy of the magnetic head is deteriorated, resulting in reduction of the track density.

In particular, the hard disk apparatus in the related art forms servo areas at fixed distances on an information recording face of a hard disk and forms data areas, into which user data are to be recorded, between the servo areas. Several tens servo areas are provided for one track, and position information necessary for positioning the magnetic head such as of the head position and of the track number, synchronization patterns necessary for acquisition of the position information and other necessary information are recorded in the servo areas.

In the hard disk apparatus, in each servo area, a clock signal is synchronized first and then the position information of the magnetic head is acquired, and processing of tracking control and so forth is executed based on the position information. In particular, a positioning system for the magnetic head forms a servo loop to position the magnetic head. In the servo system, a closed loop control band Bsv is determined based on various conditions.

In particular, the hard disk apparatus must position the magnetic head at the center of a track so as not to be influenced by various external disturbances. Some of such disturbances appear in the inside of the hard disk apparatus are periodical and non-periodical components of whirling of the spindle motor, displacement of the position of the head by vibrations of the disk or vibrations of the head supporting arm, and so forth. The other disturbances come from the outside of the hard disk apparatus are various vibrations, an impact and so forth. Such disturbances are distributed in spectrum in a particularly low frequency region lower than the frequency of 1 kHz. Consequently, the closed loop control band Bsv of the head positioning servo system is required to be at least several hundreds Hz or higher in order to sufficiently suppress such disturbances as described above.

Generally, the control band Bsv of the positioning control system for the magnetic disk or the like is required to increase in proportion to the track density TPI to half power as given by the following expression (K. K. Chew, "Control system challenges to high track density magnetic storage", IEEE Trans. Magn., Vol. 32, No. 3, pp.1799-1804, May 1996).

$$Bsv \propto (TPI)^{1/2} \tag{1}$$

Consequently, the control band Bsv of the positioning control system for a magnetic disk or the like is required to be a band similar to that of an existing hard disk apparatus whose data transfer rate is unnecessarily high.

On the other hand, the servo system of the type described above is a closed loop sampling control system, and therefore, in order to assure the stability of the control loop, it is required that the servo sampling frequency fsv should be higher by more than 10 times than the control band Bsv. In particular, a relationship given by the following expression is determined, and at present, the servo sampling frequency fsv is set at least to several kHz.

$$fsv > 10 Bsv \tag{2}$$

It is to be noted here that the servo sampling frequency fsv is the number of servo areas scanned by the magnetic head per unit time and is represented as the product of the servo area number Nsv in one circumferential track of the magnetic disk and the disk rotational speed R.

$$fsv = Nsv \cdot R \qquad (3)$$

From the expressions (1) to (3) above, the following expression is obtained:

$$Nsv \cdot R = 10 Bsv^{\alpha}(TPI)^{1/2} \qquad (4)$$

From the expression (4), it can be recognized that, if the rotational speed R of the magnetic speed is lowered to a necessary and sufficient level to record and reproduce information of moving pictures, then also the control band Bsv decreases.

If the control band Bsv decreases in this manner, particularly the performance of the magnetic disk apparatus in suppression of various disturbances is deteriorated, resulting in deterioration of the positioning accuracy of the head such that tracks cannot be formed in a high density.

One of possible solutions to this problem is to increase the servo area number Nsv per one circumference of the magnetic disk. However, the length of servo areas of a magnetic disk of the related art is comparatively long because it is required to perform processing for re-synchronizing the clock signal in each servo area and so forth. Therefore, if the servo area number Nsv is increased, then the recording capacity of the magnetic disk is deteriorated significantly as much.

SUMMARY OF THE INVENTION

It is an object of the present invention to provide a magnetic disk apparatus which allows switching of the speed of rotation of a magnetic disk while assuring a sufficient tracking control characteristic and a sufficient capacity.

In order to attain the object described above, according to the present invention, reproduction signals from a plurality of servo areas are referred to generate a servo clock signal. More particularly, according to the present invention, there is provided a magnetic disk apparatus wherein tracking of a magnetic head is controlled with reference to a plurality of servo areas formed at predetermined angular distances on a magnetic disk to access the magnetic disk including, the servo areas being formed in synchronism with a fixed clock signal such that reference patterns for tracking control are formed therein, a clock generation means for generating a clock signal common to the plurality of servo areas with reference to reproduction signals obtained from the servo areas, a tracking control signal generation means for generating a control signal for tracking control from the reference patterns with reference to the clock signal, a tracking control means for controlling tracking of the magnetic head with reference to the control signal, and a speed switching means for switching the speed of rotation of the magnetic disk.

In the magnetic disk apparatus, since the servo clock signal is generated by referring to reproduction signals from a plurality of servo areas, the clock area in one servo area can be formed short. Similarly, since also the control signal for tracking control is generated from a plurality of servo areas, one servo area can be formed short as much. Consequently, even if a large number of servo areas are formed, a reduction of the recording density can be prevented. Further, even when the magnetic disk is driven to rotate at a low speed, a drop of the sampling frequency can be prevented by forming a large number of servo areas. Accordingly, switching of the speed of rotation of the magnetic disk can be performed while assuring a sufficient tracking control characteristic and a sufficient capacity.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

1. Construction of the Embodiment

Figure 2:
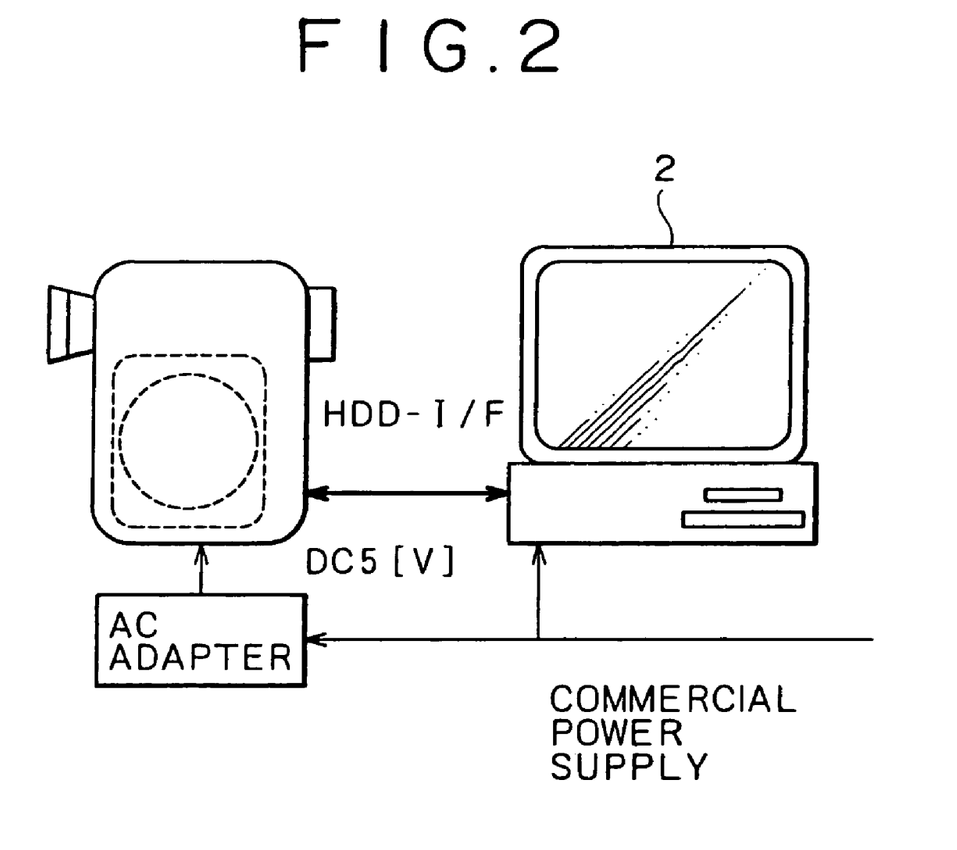
FIG. 2 is a schematic view showing a connection of the disk camera to which the present invention is applied to an external apparatus.

FIG. 2 shows a system construction of a disk camera to which the present invention is applied. Referring to FIG. 2, the disk camera is generally denoted at 1. The disk camera 1 is driven by a dry cell or battery to record an image of a desired image pickup object in the form of a moving picture or a still picture onto a built-in magnetic disk and reproduce a moving picture or a still picture recorded on the magnetic disk so that it can be monitored. The disk camera 1 can be handily carried and used to pick up images of various image pickup objects.

The disk camera 1 can be connected to a personal computer 2 through an interface (HDD-I/F) for a hard disk apparatus so that a moving picture or a still picture recorded on the built-in magnetic disk can be downloaded to the personal computer 2 so as to allow processing such as editing to be executed for the moving picture or still picture by the personal computer 2.

Further, the disk camera 1 can be driven by commercial power supply through an AC adapter, so that, when it is connected to and used together with, for example, a personal computer, exhaustion of the cell can be prevented.

The disk camera 1 sets, in its default state, the speed of rotation of the magnetic disk to 1,800 rpm (hereinafter referred to as low speed mode) to thereby have reduction of the power consumption and take precedence on noise. On the other hand, if a control command to switch the speed of rotation of the magnetic disk to a high speed is received from an external apparatus such as a personal computer through the interface (HDD-I/F) or if a downloading control command is received from an external apparatus, then the disk camera 1 sets the speed of rotation of the magnetic disk to 5,400 rpm (hereinafter referred to as high speed mode) to thereby have downloading of a result of image pickup at a high data transfer rate take precedence.

Figure 3:
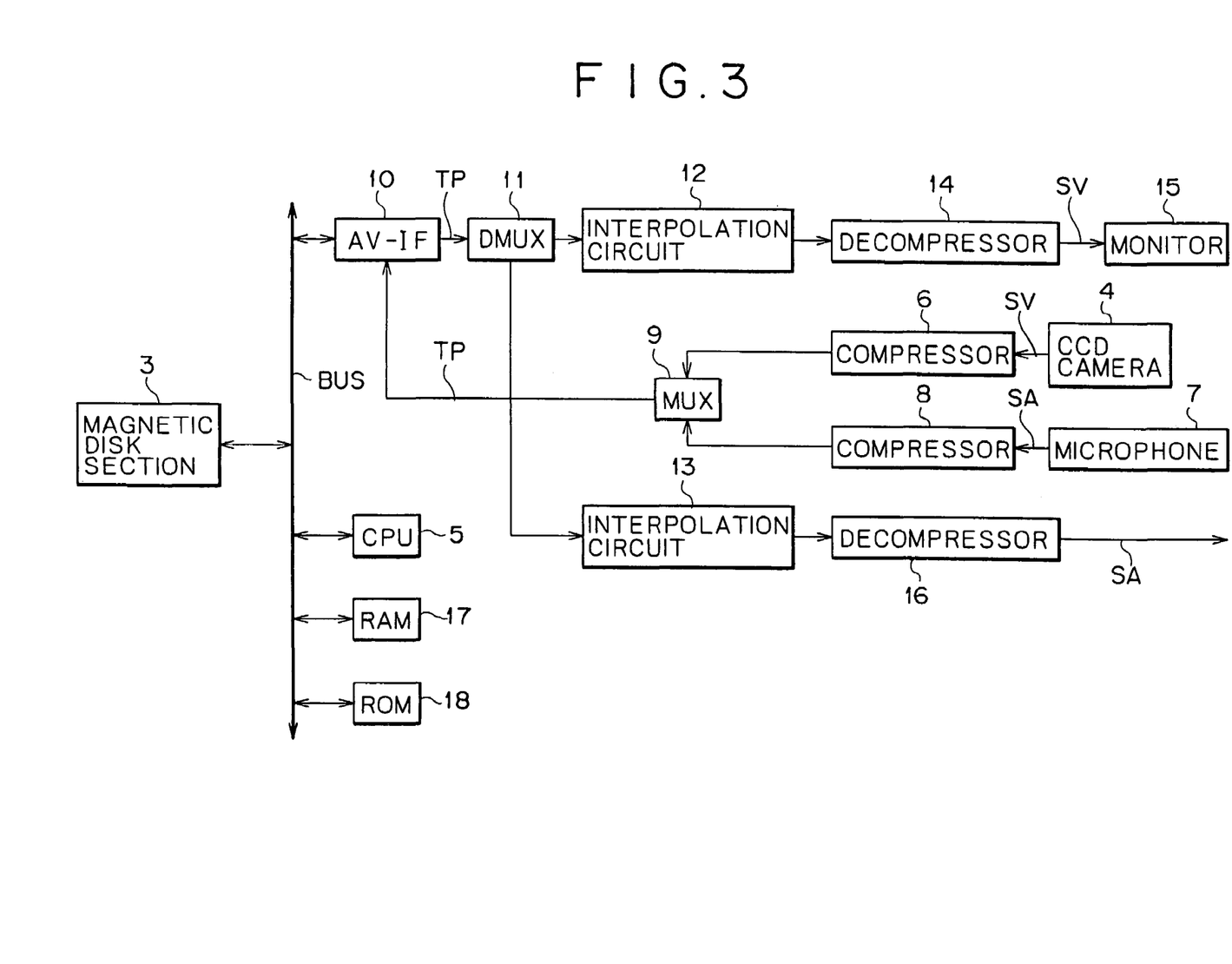
FIG. 3 is a block diagram showing the disk camera to which the present invention is applied.

FIG. 3 shows a construction of the disk camera 1. Referring to FIG. 3, the disk camera 1 shown includes a camera section 2, which outputs a moving picture or a still picture as a result of image pickup of a desired image pickup object to a magnetic disk section 3 and receives a result of image pickup in the form of a moving picture or a still picture reproduced form the magnetic disk section 3 for display. The camera section 2 includes a CCD camera 4 which is operated in response to an operation of a user under the control of a central processing unit (CPU) 5 to output a result of image pickup of a desired image pickup object in the form of a video signal SV.

A compressor 6 compresses the video signal SV under the control of the central processing unit 5 and outputs the resulting data. Thereupon, if the user selects processing on a moving picture, then the compressor 6 performs processing on the video signal SV in accordance with a format of the MPEG2 including motion compensation, discrete cosine transform, re-quantization and two-dimensional Huffman coding to compress the video signal SV to substantially ⅕ in data rate and outputs the resulting data. On the other hand, if the user selects processing of a still picture, then the compressor 6 compresses a desired frame of the video signal SV in accordance with a format of the JPEG and outputs the resulting data.

A microphone 7 acquires sound of an image pickup object and outputs an audio signal SA. Another compressor 8 compresses the audio signal SA and outputs the resulting data. A multiplexer (MUX) 9 time division multiplexes video data and audio data outputted from the compressors 6 and 8 in accordance with a format prescribed in the MPEG2 to generate an AV data stream TP of the video data and the audio data, and outputs the AV data stream TP. The AV data stream TP here has a data transfer rate of 4 to 8 Mbit/sec.

An audio-video interface (AV-IF) 10 outputs, upon recording., the AV data stream TP as described above to a bus BUS. On the other hand, upon reproduction, the audio-video interface 10 outputs an AV data stream TP transmitted over the bus BUS to demultiplexer (DMUX) 11.

Upon reproduction, the demultiplexer 11 decomposes an AV data stream TP transmitted thereto over the bus BUS into video data and audio data and outputs the video data and the audio data to a pair of interpolation circuits 12 and 13, respectively. The interpolation circuit 12 performs interpolation processing for the video data when necessary, and a decompressor 14 connected to the interpolation circuit 12 decompresses video data outputted from the interpolation circuit 12, outputting a video signal SV. A monitor 15 displays the video signal SV. Thus, the camera section 2 compresses, upon recording, data obtained as a result of image pickup acquired by the CCD camera 4 and outputs the compressed data to the bus BUS, but upon reproduction, decompresses video data transmitted thereto over the bus BUS and displays the video data on the monitor 15.

The interpolation circuit 13 performs interpolation processing for audio data outputted from the demultiplexer 11 when necessary, and a decompressor 16 connected to the interpolation circuit 13 decompresses the audio data outputted from the interpolation circuit 13, outputting an audio signal SA. Thus, the camera section 2 multiplexes, upon recording, the audio signal SA with a result of image pickup and outputs resulting data to the bus BUS, but upon reproduction, decompresses audio data transmitted thereto over the bus BUS and outputs the decompressed audio data to an external apparatus or the like.

The central processing unit 5 assures a work area in a random access memory (RAM) 17 and executes a processing procedure recorded in a read only memory. (ROM) 18 to thus form a controller for controlling operation of the camera section 2. The central processing unit 5 is operated in response to an operation of a user to effect such control that, upon recording, an AV data stream TP sent out into the bus BUS from the audio-video interface 10 is temporarily stored into the random access memory 17 and outputted at a predetermined timing to the magnetic disk section 3 to thereby output video data and audio data to be recorded in a multiplexed condition as described above to the magnetic disk section 3. Upon reproduction, however, conversely to that described above, the central processing unit 5 effects such control that AV data (video data and audio data in a multiplexed condition) outputted from the magnetic disk section 3 to the bus BUS are temporarily stored into the random access memory 17 and then outputted to the audio-video interface 10 over the bus BUS. Consequently, the video data and the audio data sent out as file data to the bus BUS are outputted as an AV data stream TP to the audio-video interface 10.

Figure 4:
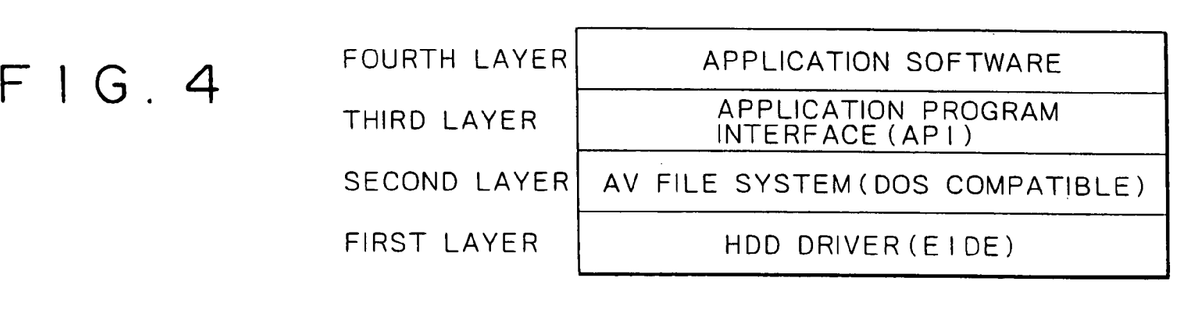
FIG. 4 is a table showing a construction of a central processing unit of the disk camera shown in FIG. 3.

FIG. 4 illustrates a software system of the processing procedure to be executed by the central processing unit 5. In the present embodiment, a DOS compatible file system is applied. In particular, the first layer which is the lowest layer is a driver for a HDD (hard disk drive), to which, for example, a driver of the extended IDE standards (ATA standards) is applied. An AV file system of the second layer is the middle ware serving as a peripheral equipment to the central processing unit 5 for converting an AV data stream TP into a file and recording the AV data stream TP onto the magnetic disk section 3, and a DOS compatible file system is applied to the AV file system of the second layer. An API of the third layer is an interface with the second layer provided for facilitating description of application software of the fourth layer, and for example, recording of a file, reading out of a file or the like is defined as a group of functions of the C language of the ANSI in the API of the third layer.

The central processing unit 5 sets, upon starting, the operation mode of the magnetic disk section 3 to the low speed mode in accordance with the application software.

The random access memory 17 forms a work area of the central processing unit 5 and serves as a buffer memory for an AV data stream TP. The read only memory 18 holds the processing procedure of the central processing unit 5 recorded therein.

Figure 5:
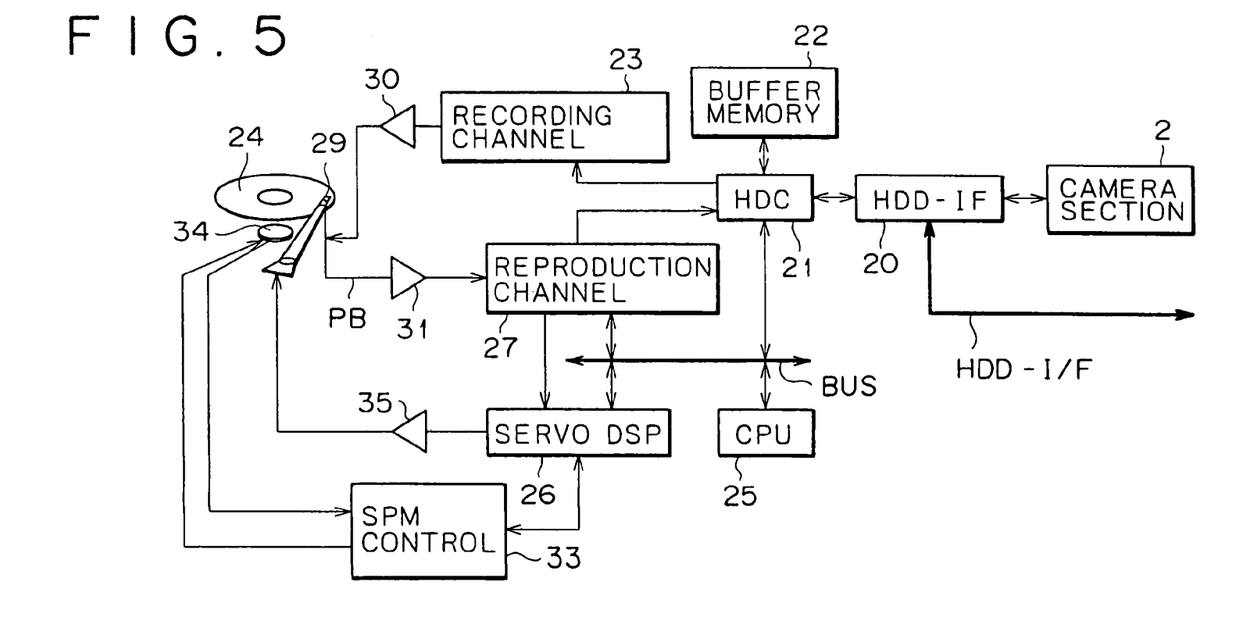
FIG. 5 is a block diagram showing a magnetic disk section of the disk camera shown in FIG. 3.

Referring to FIG. 5, the magnetic disk section 3 records AV data outputted from the camera section 2 in this manner or reproduces AV data and outputs the reproduced AV data to the camera section 2.

The magnetic disk section 3 includes a hard disk interface (HDD-IF) 20 which is an interface in accordance with the extended IDE standards (ATA standards) and outputs AV data outputted in the form of file data from the camera section 2 to a hard disk controller (HDC) 21. On the other hand, upon reproduction, the hard disk interface 20 outputs AV data outputted in the form of file data from the hard disk controller 21 to the camera section 2. The hard disk interface 20 serves as an interface with an external apparatus such as a personal computer and communicates various control commands, status data and so forth with the external apparatus and further communicates AV data in the form of file data.

The hard disk controller 21 temporarily stores AV data inputted thereto from the hard disk interface 20 into a buffer memory 22 upon recording and then reads out the AV data in a unit of a block of a predetermine data amount (for example, in a unit of 512 bytes) from the buffer memory 22 to output the read out AV data to a recording channel circuit 23. Thereupon, the hard disk controller 21 adds a preamble pattern (to be used for bit synchronization and so forth upon reproduction), error correction codes and so forth to each block to form a packet and outputs the packet in synchronism with rotation of a magnetic disk 24 to the recording channel circuit 23. Further, the hard disk controller 21 converts a logical block address of AV data outputted in the form of file data from the camera section 2 through data communication with a central processing unit (CPU) 25 into a physical address (a disk face number, a track number, a sector number and so forth) of the magnetic disk 24 and transmits the physical address to a servo DSP (digital signal processor) 26.

Further, upon reproduction, the hard disk controller 21 transmits a control command outputted from the camera section 2 to the central processing unit 25 to detect a corresponding physical address of the magnetic disk 24. The hard disk controller 21 transmits the physical address detected in this manner to the servo DSP 26, and receives AV data to be reproduced from a corresponding physical area of the thus transmitted address through a reproduction channel circuit 27. The hard disk controller 21 temporarily stores the AV data into the buffer memory 22 and then outputs the AV data in the form of file data to the camera section 2 and so forth through the hard disk interface 20. Thereupon, the hard disk controller 21 corrects errors of the reproduced AV data with the error correction codes added to the AV data upon recording and executes retrying processing if necessary.

In such a series of processes as described above, the hard disk controller 21 switches the data transfer rate of input/output data between the low speed mode and the high speed mode under the control of the central processing unit 25.

The buffer memory 22 thus forms a buffer for temporarily storing data to be recorded or reproduced upon recording or reproduction.

The recording channel circuit 23 performs, upon recording, channel coding of a packet outputted from the hard disk controller 21, converts the data of the packet into a data train of binary values conforming with a characteristic of a magnetic recording channel formed from the magnetic disk 24 and a magnetic head 29, and outputs the data train.

In the processing described above, the recording channel circuit 23 processes a packet outputted from the hard disk controller 21 at a data transfer rate corresponding to the low speed mode or the high speed mode under the control of the central processing unit 25.

A recording amplifier 30 drives the magnetic head 29 in accordance with a data train of binary values outputted from the recording channel circuit 23 so that magnetization reversal patterns are successively formed on the magnetic disk 24 in accordance with the data to be recorded. Consequently, the magnetic disk section 3 records data outputted from the camera section 2 onto the magnetic disk 24.

A reproduction amplifier 31 amplifies a reproduction signal PB obtained from the magnetic head 29 with a predetermined gain and outputs the amplified reproduction signal PB. The reproduction channel circuit 27 reproduces a clock signal from the reproduction signal PB outputted from the reproduction amplifier 31 and identifies the reproduction signal PB between binary values with reference to the clock signal to reproduce a data train of binary values. The reproduction channel circuit 27 outputs packets of the data train of binary values reproduced in this manner to the hard disk controller 21. In the processing, the reproduction channel circuit 27 switches the speed of rotation of the magnetic disk 24 between the low speed mode and the high speed mode under the control of the central processing unit 25 to switch the processing rate so as to conform with the changing data transfer rate of input data, and outputs the AV data reproduced at the data transfer rates corresponding to the low speed mode and the high speed mode to the hard disk controller 21.

A spindle motor control circuit (SPM) 33 drives a spindle motor 34 to rotate in a condition of a constant angular velocity. In this control, the spindle motor control circuit 33 drives the spindle motor 34 under the control of the central processing unit 25 to rotate such that, in the low speed mode, the rotational speed R of the magnetic disk 24 may be 1,800 rpm (30 Hz), but in the high speed mode, the rotational speed R of the magnetic disk 24 may be 5,400 rpm (90 Hz).

The reproduction channel circuit 27 processes a reproduction signal PB to detect the position of the magnetic head 29. The servo DSP 26 generates a drive signal based on a result of the position detection so that the magnetic head 29 may exhibit a just tracking capability, and outputs the drive signal to a driving amplifier 35. Further, the reproduction channel circuit 27 detects a track number of the magnetic disk 24 from the reproduction signal PB. The servo DSP 26 generates a drive signal so that the track number thus detected may coincide with a logical address designated by the hard disk controller 21 and outputs the drive signal to the driving amplifier 35 so that the magnetic head 29 may access a desired track.

The central processing unit 25 serves as a controller for controlling operation of the magnetic disk section 3. In the control, the central processing unit 25 sets, in a default state, the operation mode to the low speed mode under the control of the central processing unit 5 of the camera section 2. On the other hand, if a control command for switching the operation mode is received from an external apparatus through the hard disk interface 20 or if an instruction to download recorded contents of the magnetic disk 24 is received, the central processing unit 25 sets the operation mode to the high speed mode.

Figure 1A:
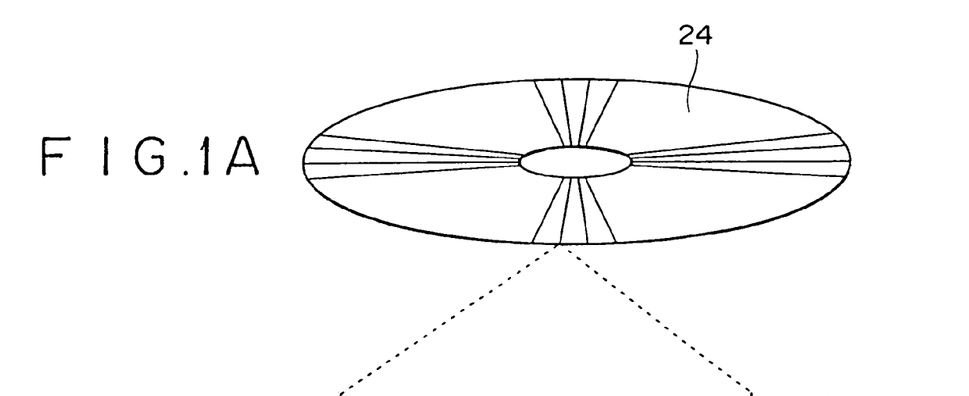
FIGS. 1A and 1B are schematic diagrammatic views showing a magnetic disk applied to a disk camera to which the present invention is applied.
Figure 1B:
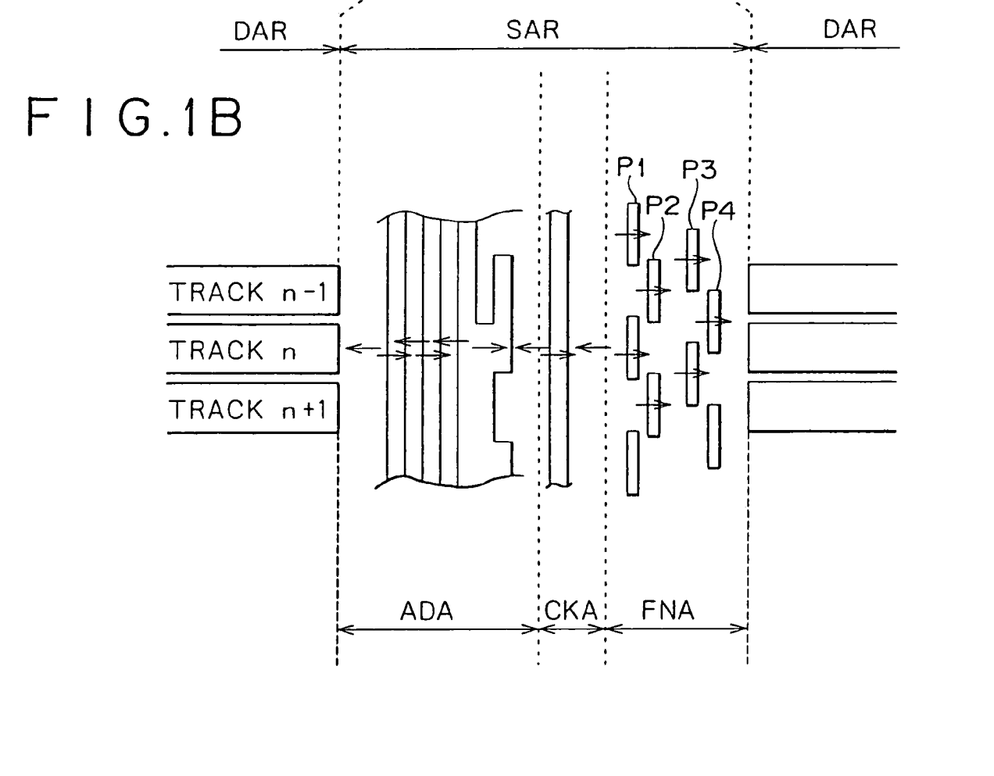

FIGS. 1A and 1B schematically illustrate a construction of the magnetic disk 24. It is to be noted that, in FIG. 1B, each arrow mark indicates a magnetization direction of an information recording face.

Referring to FIGS. 1A and 1B, on the magnetic disk 24, servo areas SAR are formed at predetermined angular distances, and data areas DAR for recording AV data therein are formed between the servo areas SAR.

The servo areas SAR are generated in synchronism with a fixed clock signal. Consequently, when the magnetic disk 24 is driven to rotate at a constant angular velocity, even if synchronization of the clock signal is not established for each of the servo areas SAR, tracking control information and so forth can be acquired from the magnetic disk 24. Making effective use of this characteristic, the servo areas SAR are formed with a sufficiently great length when compared with that of a magnetic disk of the related art. Further, for example, 200 such servo areas SAR are formed on one track. Consequently, the magnetic disk 24 can effectively prevent a drop of the recording density and assure a sufficient control characteristic even if the speed of rotation drops.

Each of the servo areas SAR includes an address area ADA for recording a track number and a sector number therein, a clock area CKA for clock synchronization, and a tracking area FNA for tracking control, formed thereon in this order from the scanning starting side of the magnetic head 29.

In the address area ADA, magnetization patterns are formed successively in a unit of one period of a clock signal which serves as a reference for production of the servo areas SAR such that a track number and a sector number in the form of Gray codes are recorded in the form of magnetization patterns. In the clock area CKA, a magnetization pattern is formed in a unit of one period of the clock signal similarly such that it extends in a radial direction of the magnetic disk 24. Upon reproduction, synchronism of the clock signal can be established with reference to the magnetization pattern.

In the tracking area FNA, magnetization patterns in a unit of one period of the clock signal are successively formed at predetermined positions. In particular, in the tracking area FNA, a magnetization pattern P2 or P1 disposed at the track center and another magnetization pattern P1 or P2 formed in an off-tracking state by one track pitch in a radial direction of the magnetic disk 24 with respect to the magnetization pattern P2 or P1 are disposed. Consequently, the tracking area FNA allows determination of a track between an odd-numbered track and an even-numbered track based on a signal level of a reproduction signal PB obtained from one of the pair of magnetization patterns P1 and P2.

Further, in the tracking area FNA, a pair of magnetization patterns P3 or P4 formed in an off-tracking state by a ½ track pitch in a radial direction of the magnetic disk 24 from the track centers are disposed following the magnetization patterns P1 or P2, respectively. Consequently, the tracking area FNA allows detection of a tracking error amount, which is position information of the magnetic head 29, from a signal level difference between reproduction signals PB obtained from the pair of magnetization pattern P3 or P4.

Figure 6:
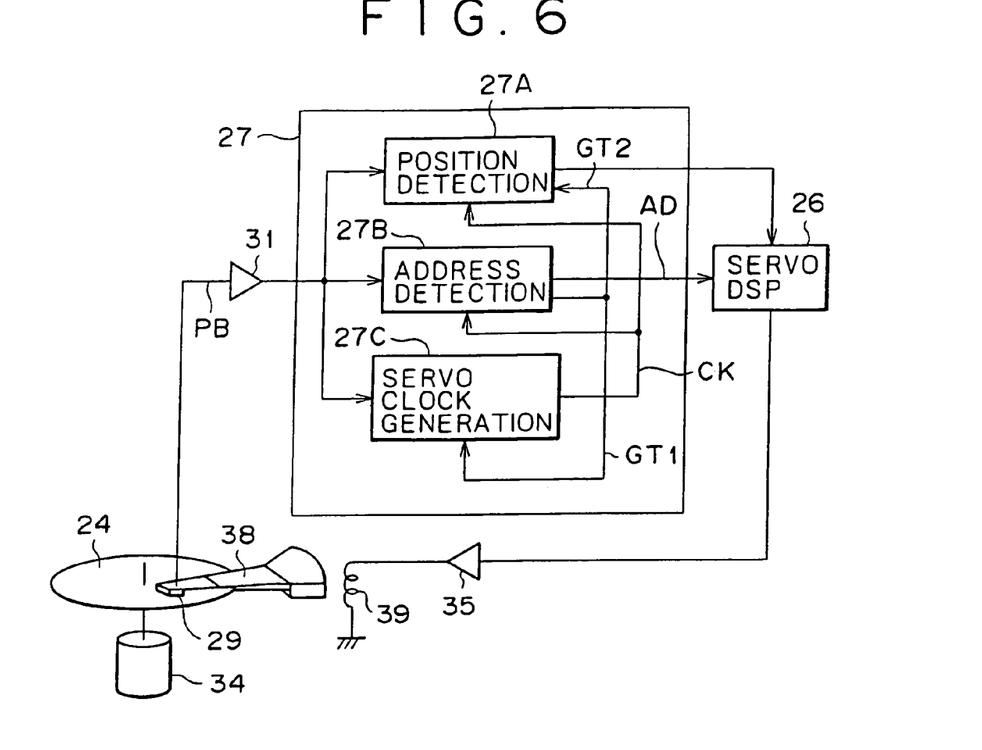
FIG. 6 is a block diagram showing a servo system of the magnetic disk section shown in FIG. 5.

FIG. 6 shows the head positioning servo system. A reproduction signal PB outputted from the magnetic head 29 through the reproduction amplifier 31 is inputted to a position detection circuit 27A, an address detection circuit 27B and a servo clock generation circuit 27C, those provided in the reproduction channel circuit 27.

The servo clock generation circuit 27C fetches a reproduction signal PB at a timing, at which the magnetic head 29 scans a clock area CKA, in response to a gate signal GT1 outputted from the address detection circuit 27B, and reproduces a servo clock signal CK with reference to the reproduction signal PB. In the operation just described, since the servo areas of the magnetic disk 24 are formed in synchronism with the fixed clock signal, the servo clock generation circuit 27C can generate the servo clock signal CK with a high degree of accuracy with reference to the magnetization pattern formed in the clock area CKA.

When the servo clock generation circuit 27C generates the servo clock signal CK in this manner, it switches the characteristics of a VCO (voltage controlled oscillator) of a PLL (phase locked loop) circuit built therein between the low speed mode and the high speed mode under the control of the central processing unit 25 so that the servo clock signal CK can be generated with certainty even if the operation mode is switched between the low speed mode and the high speed mode.

The address detection circuit 27B identifies the reproduction signal PB between binary values with reference to the servo clock signal CK to detect an address AD provided by a track number and a sector number from the address area ADA, and outputs the address AD to the servo DSP 26 together with the face number of the magnetic disk 24. Further, the address detection circuit 27B measures the time by means of the servo clock signal CK with reference to a detection timing of the address AD to generate a gate signal GT1 whose signal level rises for a period of time for which the magnetic head 29 scans the clock area CKA, and outputs the gate signal GT1 to the servo clock generation circuit 27C. Similarly, the address detection circuit 27B generates a gate signal GT2 whose signal level rises for a period of time for which the magnetic head 29 scans the tracking area FNA, and outputs the gate signal GT2 to the position detection circuit 27A.

The position detection circuit 27A detects the signal level of the reproduction signal PB with reference to the gate signal GT2 and the servo clock signal CK to detect the signal level of the reproduction signal PB obtained from the four kinds of magnetization patterns P1 to P4 allocated to each block in the tracking area FNA. The position detection circuit 27A detects the level difference between the magnetization patterns P1 and P2 and between the magnetization patterns P3 and P4 corresponding to each other with the signal levels detected in this manner to generate two kinds of position detection signals whose signal levels vary in accordance with a detrack amount and which have phases different from each other with respect to the detrack amount.

The servo DSP 26 compares the address AD detected by the address detection circuit 27B, an address based on the face number and a physical address inputted thereto from the hard disk controller 21, outputs a drive signal to the driving amplifier 35 based on a result of the comparison when necessary, and causes the magnetic head 29 to perform a seeking operation for a sector designated by the hard disk controller 21. Further, the servo DSP 26 generates a control signal for tracking control from the two kinds of position detection signals outputted from the position detection circuit 27A and outputs the drive signal to the driving amplifier 35, to thereby effect tracking control of the magnetic head 29.

In the operation as described, the magnetic head 29 is held at an end of an arm 38, which can be pivoted around a predetermined pivot shaft, and the arm 38 is driven by a voice coil motor serving as an electromagnetic actuator. The driving amplifier 35 drives a coil 39 of the voice coil motor with a drive signal outputted from the servo DSP 26.

2. Operation of the Embodiment

When power supply to the disk camera 1 (FIGS. 3, 5 and 6) having the construction described above is turned on, the magnetic disk 24 is driven to rotate at a speed of rotation of 1,800 rpm (30 Hz) by the spindle motor 34 in response to an instruction of the central processing unit 5. Consequently, the operation mode of the disk camera 1 is set to the low speed mode. In this state, the disk camera 1 detects a reproduction signal PB. The reproduction signal PB is amplified by the reproduction amplifier 31 and processed by the reproduction channel circuit 27 to detect position information of the magnetic head 29 and so forth.

Since the magnetic disk 24 (FIG. 1) has 200 servo areas SAR formed along a circumference thereof, the servo sampling frequency fsv=6 kHz is obtained by substituting the rotational speed R=1,800 rpm (30 Hz) and the servo area number Nsv=200 into the expression (3) above. Thus, it can be seen from the expression (2) that the control band Bsv for suppressing disturbances can be assured up to approximately 600 Hz. Consequently, the disk camera 1 can assure a tracking control characteristic similar to that of the related art disk camera, even if the magnetic disk 24 is driven to rotate at a speed of 1,800 rpm which is the low speed.

It is to be noted that, if it is tried to assure the servo sampling frequency fsv=6 kHz with a hard disk apparatus having a constriction of the related art, then, for example, where the servo area number Nsv is Nsv=60, the disk rotational speed must be raised up to 6,000 rpm (100 Hz). In other words, by forming the servo areas SAR synchronized with the predetermined clock signal in this manner, the rotational speed R can be decreased to ⅓ or less while a similar control band is assured.

Further, since the servo clock signal is normally generated with reference to the reproduction signals from a plurality of servo areas, even if synchronization of the clock signal is not established for each of the servo areas SAR, information necessary for tracking control and so forth can be acquired, and consequently, the servo areas SAR can be formed shorter than those on the related art magnetic disk. Consequently, even if the servo area number Nsv per one circumference is increased from that of the related art magnetic disk, a recording capacity of a level similar to that of the related art magnetic disk can be assured.

In particular, in the disk camera 1 (FIG. 6), a reproduction signal PB outputted from the magnetic head 29 is amplified with a predetermined gain by the reproduction amplifier 31 and then inputted to the servo clock generation circuit 27C, by which a servo clock signal CK is generated with reference to the magnetization pattern in the clock area CKA. Further, the reproduction signal PB is identified between binary values with reference to the servo clock signal CK by the address detection circuit 27B, and consequently, an address AD provided by a track number and a sector number recorded in the address area ADA is reproduced. Further, by processing the reproduction signal PB with reference to the servo clock signal CK similarly, a control signal for tracking control is generated with reference to the magnetization patterns P1 to P4 recorded in the tracking area FNA. In the disk camera 1, a desired track is accessed with an address detected in this manner and processing for tracking control is executed based on the control signal for tracking control.

In particular, in the disk camera 1, while tracking control is performed in such a manner as described above and a desired track is accessed, data of a result of image pickup acquired by the CCD camera 4 (FIG. 3) are compressed as a moving picture or a still picture and data of an audio signal acquired by the microphone 7 are compressed similarly. Resulting video data and audio data are time-division multiplexed by the multiplexer 9 to generate an AV data stream TP. The AV data stream TP is inputted in the form of file data to the magnetic disk section 3 through the random access memory 17.

In the magnetic disk section 3 (FIG. 5), the AV data stream TP inputted in this manner is converted into AV data of a sector structure in a unit of a predetermined data amount through the buffer memory 22. The AV data having the sector structure are converted into a drive signal for the magnetic head 29 by the recording channel circuit 23. The magnetic head 29 is driven with the drive signal so that the AV data are recorded onto the magnetic disk 24.

Upon reproduction, a reproduction signal PB obtained by the magnetic head 29 is processed by the reproduction channel circuit 27 to generate reproduction data. The reproduction data are subject to such processing as error correction and so forth by the hard disk controller 21 so that AV data are reproduced. The AV data reproduced are stored into the buffer memory 22. The AV data are outputted in the form of file data to the camera section 2 (FIG. 3), in which the AV data are decomposed into video data and audio data by the demultiplexer 11. The video data are subject to interpolation processing by the interpolation circuit 12 and then decompression processing by the decompressor 14 so that an original moving picture or still picture is reproduced. The thus reproduced moving picture or still picture is displayed on the monitor 15. Meanwhile, the audio data are subject to interpolation processing by the interpolation circuit 13 and then decompression processing by the decompressor 16, and resulting data are outputted to an external apparatus or some other apparatus. In this manner, video data and audio data are reproduced from the magnetic disk 24.

Upon such recording/reproduction of video data and so forth, in the embodiment described above, video data are compressed in accordance with the MPEG2 standards. Thus, the average data transfer rate of the AV data stream TP is 4 to 8 Mbit/sec.

Meanwhile, since the disk camera 1 drives the magnetic disk 24 to rotate at the low speed of 1,800 rpm, a sufficient margin in time can be secured for a seeking operation of the magnetic head 29 and so forth to record or reproduce an AV data stream TP onto or from the magnetic disk 24 at a data transfer rate corresponding to the average data transfer rate of 4 to 8 Mbps for the AV data stream TP.

Figure 7:
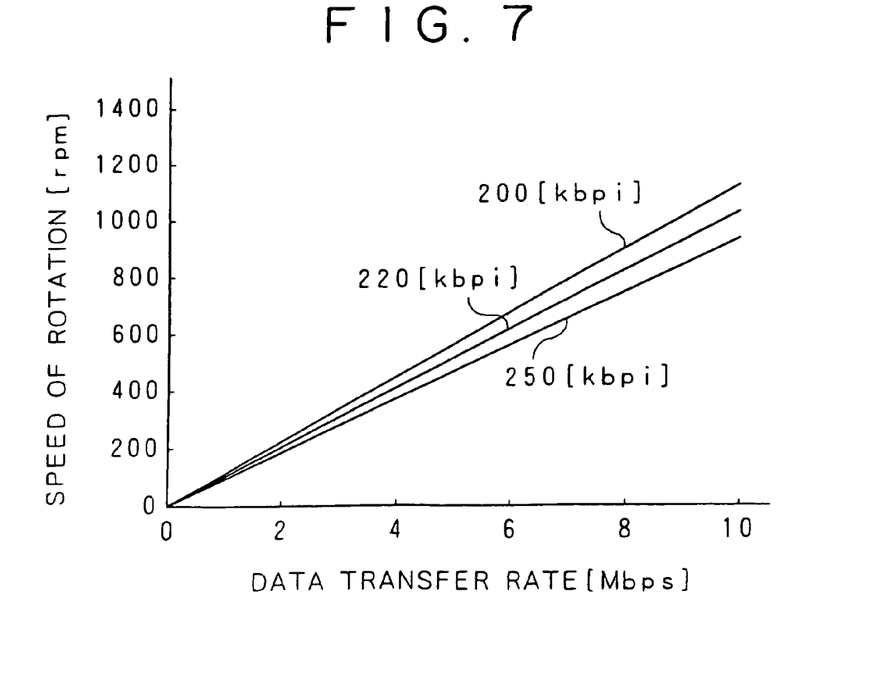
FIG. 7 is a characteristic diagram illustrating a relationship between the data transfer rate and the speed of rotation of a magnetic disk.

FIG. 7 is a characteristic diagram illustrating a relationship between the data transfer rate and the speed of rotation of the magnetic disk particularly where the recording density on a magnetic disk of 2.5 inches is varied among 200 kbpi, 220 kbpi and 250 kbpi. It is to be noted here that it is assumed that the seek time of the magnetic head 29 has an ordinary value of 2 msec. From FIG. 7, it can be seen that, in order to obtain the average data transfer rate of 4 to 8 Mbit/sec, the speed of rotation of the magnetic disk 24 may be approximately 400 to 900 rpm. It is to be noted that the characteristics illustrated are obtained using 8/9 coding for modulation while no retrying processing is performed.

Consequently, the disk camera 1 can achieve reduction of the power consumption required for driving rotation of the magnetic disk 24. Incidentally, in the disk camera 1, the spindle motor consumes power of approximately ⅓ of the total power consumption of the disk camera 1, and the power consumption of the spindle motor is represented by a function linear to the speed of rotation (M. Sri-Jayantha, H. Tokumitsu and A. Aoyagi, "HDA Configuration for Minimum Idle Mode Power by Optimum Read/Write Head Position", IBM Technical Disclosure Bulletin, Vol. 36, No. 06A, pp.181-184, June 1993). Accordingly, by reducing the speed of rotation of the magnetic disk 24 to ⅓, the power consumption can be reduced significantly.

Consequently, also the power consumption of the recording channel circuit 23, reproduction channel circuit 27 and hard disk controller 21 can be reduced, and the total power consumption can be further reduced as much. Incidentally, since the recording channel circuit 23, reproduction channel circuit 27 and hard disk controller 21 include CMOS logic circuits or the like which successively perform processing of data at several tens Mbit/sec or more, the power consumption varies in response to the operation frequency.

Further, the reduction of the speed of rotation of the magnetic disk 24 reduces rotational noise. Consequently, when recording of sound is performed, the amount of background noise can be reduced, and this allows recording of sound with a high S/N ratio. Further, generation of noise of the overall apparatus can be suppressed low.

In the sequence of operations described above, if the disk camera 1 is connected to the personal computer 2 or some other apparatus (FIG. 2) and an instruction to switch the operation mode to the high speed mode is received from the personal computer 2 or if an instruction to download a file recorded on the magnetic disk 24 is received, then the control command indicating the instruction is transmitted from the hard disk interface 20 to the central processing unit 25 in the disk camera 1. Consequently, the operation mode is switched to the high speed mode by the control of the central processing unit 25.

In particular, in the disk camera 1, the magnetic disk 24 is driven to rotate at the speed of rotation of 5,400 rpm (90 Hz) by the spindle motor 34, and in this condition, a file designated by the personal computer 2 is reproduced from the magnetic disk 24 and outputted to the personal computer 2 through the hard disk interface 20.

In the high speed mode, since the speed of rotation of the magnetic disk 24 is raised to three times that in the low speed mode, the file of the magnetic disk 24 can be downloaded requiring a time reduced as much.

In particular, in the disk camera 1, if it is assumed that the recording capacity of the magnetic disk 24 is 1 GBytes, then the magnetic disk 24 allows recording thereon of moving pictures of the average data transfer rate of 8 Mbit/sec for 1,000 seconds, and if the data are transferred to the computer at a real time speed, then the time of 1,000 seconds is required for the transfer of the data. In contrast, if the operation mode is set to the high speed mode setting the speed of rotation of the magnetic disk 24 to 5,400 rpm, then the data transfer rate is approximately 100 Mbit/sec at maximum. Consequently, in the high speed mode, an average data transfer rate of approximately 40 Mbit/sec can be assured. In this instance, the recorded contents of the magnetic disk 24 can be transferred in 200 seconds (which is approximately ⅕ that in the low speed mode). Consequently, works on data such as editing on the computer and processing such as long-term storage into a file server can be completed in a short time.

Further, since the speed of rotation of the magnetic disk 24 then is 5,400 rpm (90 Hz), by substituting this into the expression (3) above, the servo sampling frequency fsv of 18 kHz is obtained. Accordingly, from the expression (2) above, a sufficient control band up to approximately 1.8 kHz can be assured, and consequently, a sufficiently high degree of head positioning accuracy can be achieved. Accordingly, a track density which depends upon the performances of the magnetic head 29, magnetic disk 24 and so forth can be assured, and a reduction of the recording capacity can be prevented.

Further, to the disk camera 1, power whose consumption is high while the speed of rotation of the magnetic disk 24 is high in the high speed mode is supplied from the commercial power supply through an AC adapter. Consequently, sudden dissipation of a battery or the like can be prevented.

3. Effects of the Embodiment

With the disk camera 1 having the construction described above, since reproduction signals of a plurality of servo areas are referred to generate a clock signal, a control signal for tracking control can be generated even where the servo areas are short. Where a large number of servo areas are formed on the magnetic disk, even if the speed of rotation of the magnetic disk is switched, a sufficient tracking control characteristic and a sufficient capacity can be assured.

Accordingly, moving pictures can be recorded for a long time onto a magnetic disk of a large capacity in low power consumption and in low noise production. Further, the thus recorded moving pictures for a long time can be downloaded in a short time to a server or the like.

Particularly, where the low speed mode is set so that the magnetic disk is rotated at the low speed to reduce the power consumption, driving with a battery which has previously been actually difficult with the related art magnetic disk apparatus can be realized, and this augments the portability of the magnetic disk apparatus.

4. Other Embodiments

While, in the embodiment described above, a servo area is formed from magnetization patterns, the present invention is not limited to this, and various servo area formation techniques can be applied widely including a technique wherein a magnetic film is partially removed, for example, by etching or a like method to form a pattern shape and then the remaining magnetic film is dc magnetized in one direction by means of a magnetic head or the like to form such servo areas as described above and another technique wherein concave and convex patterns corresponding to magnetization patterns are formed on a surface of a disk base plate and then the concave portions and the convex portions are magnetized with the opposite polarities to form such servo areas as described above.

Further, while, in the embodiment described above, the speed of rotation of the magnetic disk is switched between two stages, the present invention is not limited to this and can be applied to another case wherein the speed of rotation of the magnetic disk is switched among a plurality of stages more than two stages to different data transfer rates.

Furthermore, while, in the embodiment described above, the present invention is applied to a hard disk apparatus, the present invention is not limited to this and can be applied widely to various magnetic disk apparatus such as a removable type hard disk apparatus which includes a removable hard disk.

Further, while, in the embodiment described above, data of a result of image pickup are compressed in accordance with the MPEG2 and JPEG standards, the present invention is not limited to this and can employ various data compression techniques including the DV.

While a preferred embodiment of the present invention has been described using specific terms, such description is for illustrative purposes only, and it is to be understood that changes and variations may be made without departing from the spirit or scope of the following claims.

What is claimed is:

1. A magnetic disk apparatus wherein tracking of a magnetic head is controlled with reference to a plurality of servo areas formed at predetermined angular distances on a magnetic disk to access the magnetic disk, the servo areas being formed in synchronism with a fixed clock signal such that reference patterns for tracking control are formed in the magnetic disk, the apparatus comprising:

clock generation means for generating a clock signal common to the plurality of servo areas based on reproduction signals obtained from the servo areas;

tracking control signal generation means for generating a control signal for tracking control from the reference patterns based on the clock signal;

tracking control means for controlling tracking of said magnetic head based on the control signal; and speed switching means for switching the speed of rotation of the magnetic disk.

2. A magnetic disk apparatus according to claim 1, wherein said magnetic head accesses areas between the servo areas of the magnetic disk to record video data and audio data into the areas between the servo areas.

3. A magnetic disk apparatus according to claim 2, further comprising video data generation means for acquiring the video data.

4. A magnetic disk apparatus according to claim 3, wherein said video data generation means includes an image pickup means for picking up an image of a desired image pickup object and outputting a result of the image pickup, and data compression means for compressing data of the result of the image pickup to generate the video data.

5. A magnetic disk apparatus according to claim 2, further comprising data compression means for processing a desired audio signal and compressing data of the processed audio signal to generate the audio data.

6. A magnetic disk apparatus according to claim 1, further comprising means for removably holding the magnetic disk.

7. A magnetic disk apparatus according to claim 1, wherein, when the speed of rotation of the magnetic disk is switched to a low speed, the speed of rotation of the magnetic disk is equal to or lower than 2,000 rpm.

8. A magnetic disk apparatus according to claim 1, wherein said magnetic head accesses areas between the servo areas of the magnetic disk to reproduce video data and audio data from the areas between the servo areas.

9. A magnetic disk apparatus wherein tracking of a magnetic head is controlled with reference to a plurality of servo areas formed at predetermined angular distances on a magnetic disk to access the magnetic disk, the servo areas being formed in synchronism with a fixed clock signal such that reference patterns for tracking control are formed in the magnetic disk, the apparatus comprising:

a clock generation unit configured to generate a clock signal common to the plurality of servo areas based on reproduction signals obtained from the servo areas;

a tracking control signal generation unit configured to generate a control signal for tracking control from the reference patterns based on the clock signal;

a tracking control unit configured to control tracking of said magnetic head based on the control signal; and     a speed switching unit configured to switch the speed of rotation of the magnetic disk.

10. A magnetic disk apparatus according to claim 9, wherein said magnetic head is configured to access areas between the servo areas of the magnetic disk to record video data and audio data into the areas between the servo areas.

11. A magnetic disk apparatus according to claim 10, further comprising a video data generation unit configured to acquire the video data.

12. A magnetic disk apparatus according to claim 11, wherein said video data generation unit includes an image pickup unit configured to pick up an image of a desired image pickup object and output a result of the image pickup, and a data compression unit configured to compress data of the result of the image pickup to generate the video data.

13. A magnetic disk apparatus according to claim 10, further comprising a data compression unit configured to process a desired audio signal and compress data of the processed audio signal to generate the audio data.

14. A magnetic disk apparatus according to claim 9, further comprising a holding unit configured to removably hold the magnetic disk.

15. A magnetic disk apparatus according to claim 9, wherein, when the speed of rotation of the magnetic disk is switched to a low speed, the speed of rotation of the magnetic disk is equal to or lower than 2,000 rpm.

16. A magnetic disk apparatus according to claim 9, wherein said magnetic head is configured to access areas between the servo areas of the magnetic disk to reproduce video data and audio data from the areas between the servo areas.

\* \* \* \* \*